(12) United States Patent
Wiesen et al.

(10) Patent No.: US 9,336,073 B1
(45) Date of Patent: May 10, 2016

(54) WRITE FAULT MODULATION

(71) Applicants: Kurt Charles Wiesen, Lyons, CO (US); Randall Clement Bauck, Longmont, CO (US)

(72) Inventors: Kurt Charles Wiesen, Lyons, CO (US); Randall Clement Bauck, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 156 days.

(21) Appl. No.: 14/191,739

(22) Filed: Feb. 27, 2014

(51) Int. Cl.
 *G11B 5/02* (2006.01)
 *G11B 27/36* (2006.01)
 *G11B 5/09* (2006.01)
 *G06F 11/07* (2006.01)

(52) U.S. Cl.
 CPC .................................... *G06F 11/073* (2013.01)

(58) Field of Classification Search
 CPC .... G11B 5/59627; G11B 5/584; G11B 5/488; G11B 5/59688; G11B 21/083; G11B 5/59633; G11B 5/58; G11B 5/5547
 USPC ......... 360/75, 60, 77.01, 77.02, 77.07, 77.17, 360/78.14, 77.06, 77.08
 See application file for complete search history.

(56) References Cited

U.S. PATENT DOCUMENTS

| 6,178,054 | B1 | 1/2001 | Wakefield | |
|---|---|---|---|---|
| 6,421,197 | B1 * | 7/2002 | Abdelnour | B82Y 10/00 360/77.02 |
| 6,496,315 | B1 | 12/2002 | Ueda | |
| 6,906,883 | B2 | 6/2005 | Chu | |
| 6,940,679 | B1 | 9/2005 | McNeil | |
| 7,349,174 | B2 | 3/2008 | Bi | |
| 7,423,828 | B2 * | 9/2008 | Emo et al. | G11B 5/5582 360/53 |
| 7,916,422 | B1 | 3/2011 | Guo | |
| 8,174,785 | B2 | 5/2012 | Tanner | |

OTHER PUBLICATIONS

U.S. Appl. No. 14/019,217—Identifying Track Pitch Capability of a Recording Device.

* cited by examiner

*Primary Examiner* — Nabil Hindi
(74) *Attorney, Agent, or Firm* — Cesari & Reed LLP; Kirk A. Cesari; Christian W. Best (57) ABSTRACT

Systems and methods are disclosed for write fault modulation. In an embodiment, an apparatus may comprise a circuit configured to adjust a write fault value for a data storing system based on a circumferential point of a target data storage location, and write data based on the write fault value. The write fault value may represent an amount of off-track deviation of a data writing system within which data writing operations may be performed. In another embodiment, a memory device may store instructions that cause a processor to perform a method including receiving a write command including write data, determining a write fault threshold for a circumferential point of a target location of the write data, performing, using a transducer, a write operation at the circumferential point based on the write fault threshold, and suspending the write operation when a positional deviation of the transducer exceeds the write fault threshold.

18 Claims, 6 Drawing Sheets

WRITE FAULT MODULATION

SUMMARY

In an embodiment, an apparatus may comprise a circuit configured to adjust a write fault value for a data storing system based on a circumferential point of a target data storage location, and write data based on the write fault value. The write fault value may represent an amount of off-track deviation of a data writing system within which data writing operations are performed.

In another embodiment, a memory device may store instructions that, when executed, cause a processor to perform a method including receiving a write command including write data, determining a first write fault threshold for a first circumferential point of a target location of the write data, performing, using a transducer, a write operation at the first circumferential point based on the first write fault threshold, and suspending the write operation when a positional deviation of the transducer exceeds the first write fault threshold.

In another embodiment, an apparatus may comprise a data storage medium including tracks, a transducer to perform data storage operations, and a processor. The processor may be configured to select a write fault threshold for a circumferential point of a target data storage location, the write fault value representing an amount of off-track deviation of the transducer within which data writing operations are performed, and control data storage operations to the data storage medium using the transducer based on the selected write fault threshold.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, separated, exchanged, or removed without departing from the scope of the present disclosure.

Figure 1:
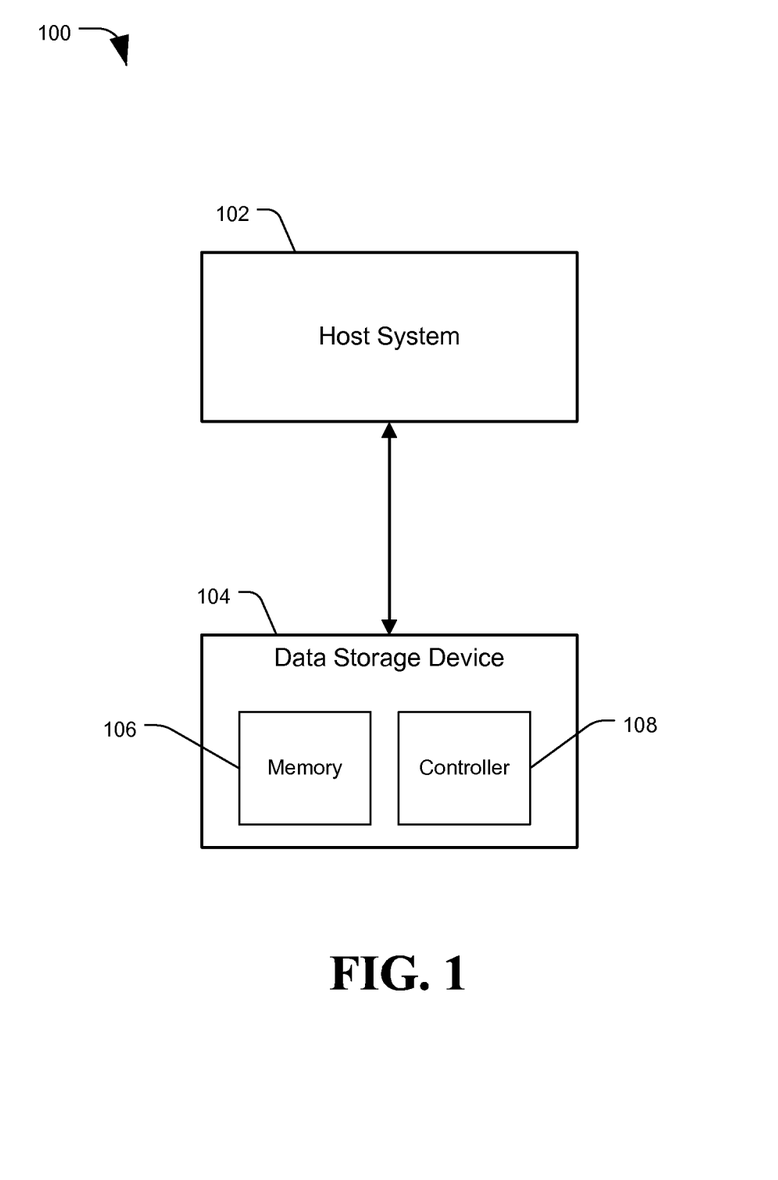
FIG. 1 is a diagram of an illustrative embodiment of a system for write fault modulation.

FIG. 1 depicts an embodiment of a system for write fault modulation, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or a combination thereof. The controller 108 may comprise a circuit or processor configured to control operations of the data storage device 104, such as storing data to or retrieving data from the memory 106. The DSD 104 may receive a data read or write request from the host device 102, and use the controller 108 to perform data operations on the memory 106 based on the request.

Figure 2:
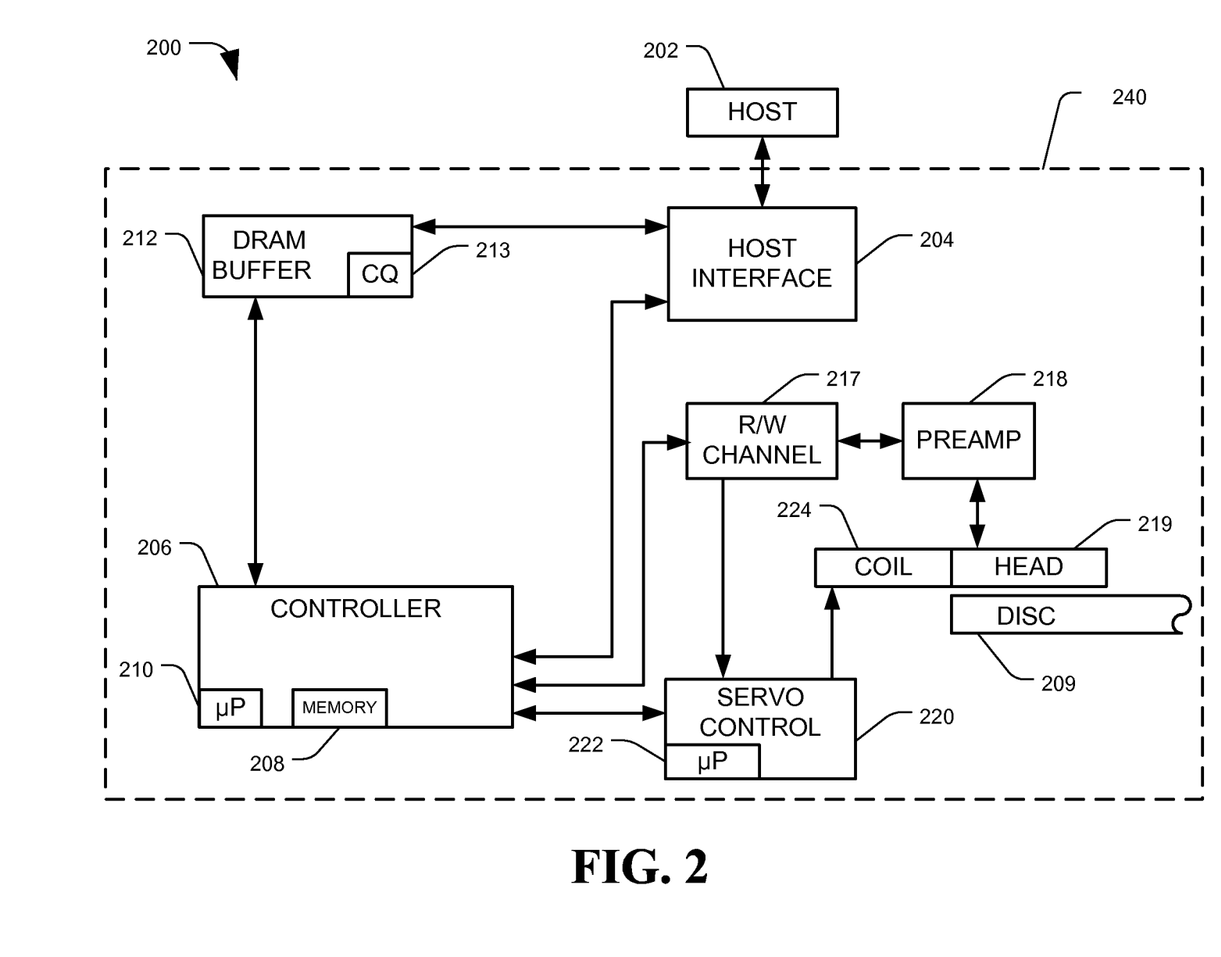
FIG. 2 is a diagram of another illustrative embodiment of a system for write fault modulation.

FIG. 2 depicts another diagram of an embodiment of a system for write fault modulation, generally designated 200. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In embodiments having one or more disk memories 209, FIG. 2 shows the DSD 200 can include a read-write (R/W) channel 217, which can encode data during write operations and reconstruct user data retrieved from disc(s) 209 during read operations. A preamplifier circuit (preamp) 218 can apply write currents to the head(s) 219 and provides pre-amplification of read-back signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213. In some embodiments, the DSD 200 may include solid state memory instead of or in addition to disc memory.

The data storage capability of a given media recording surface can depend in part on the track density (e.g., the number of tracks per unit of radial width such as tracks per inch, TPI). Factors influencing TPI can include the recording sub-system (RSS) (e.g., head, disk, preamp, read channel) as well as servo-mechanical elements. Increasing TPI, for example by bringing the centerlines of adjacent tracks closer together, can also increase areal data density of a storage medium.

Increasing TPI, however, may make the servo reliability or error rate of the recording system more susceptible to track misregistration (TMR) which can involve misalignments of the transducer with a given track. TMR errors can arise from a number of factors, including operational aspects of the recording subsystem or the servo-mechanical control system. TMR can also arise from external effects, such as through the application of externally generated vibration to a device.

Figure 3A:
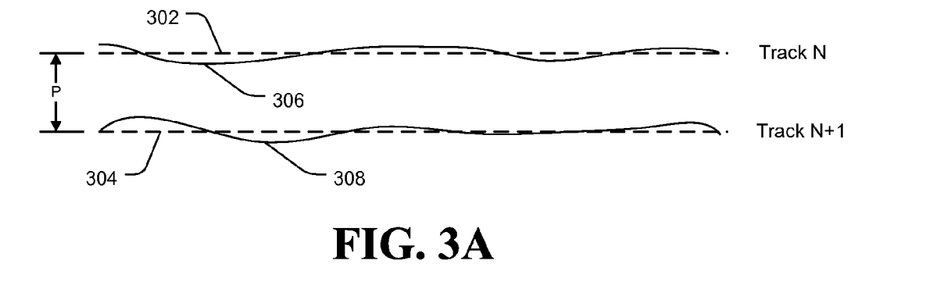
FIGS. 3A and 3B is a diagram of another illustrative embodiment of a system for write fault modulation.

FIG. 3A shows two example tracks defined on a recording surface of a recording medium, such as disc(s) 209 of FIG. 2. The tracks are identified as track N and track N+1. Each of the tracks are defined by nominal centerlines 302, 304, depicted as dashed lines. The nominal centerlines 302, 304 are separated by a nominal track pitch P. Each of the centerlines 302, 304 are at a fixed radius of the medium and represent an ideal circular path around the center of the medium. The tracks vary radially about these centerlines 302, 304 due to a number of repeatable runout (RRO) and non-repeatable runout (NRRO) components. RRO components contribute to head to track misregistration that is the same over each revolution of the medium. NRRO components vary over each revolution of the medium.

For example, the RRO components may include errors due to the placement of the servo data used by the servo circuit, such as servo control 220 of FIG. 2, to define the tracks. The servo data define somewhat "wavy" centerlines 306, 308 that deviate from the ideal centerlines 302, 304, and these variations will be experienced over each revolution. NRRO components arise due to a number of factors associated with the recording subsystem (e.g., read head, etc.), the servo-mechanical system (servo, VCM, etc.), and external sources (externally generated vibration, etc.). These RRO and NRRO components influence the ability of the servo control circuit to cause the write transducer to be positioned to write data precisely or exactly along the centerlines of the tracks defined by the servo data.

When TMR becomes too severe, data written to track N+1 may overwrite data written to track N, to the point where data on track N cannot be recovered. Failure to recover data from a track may be referred to as a hard error. This can be especially prevalent when storage mediums have a high TPI. In order to reduce the likelihood of data loss due to off-track writing, recording systems may use write fault gates during data storage operations. Write fault gates may prevent a transducer from writing data if the transducer has deviated too far from the center of the target track.

Figure 3B:
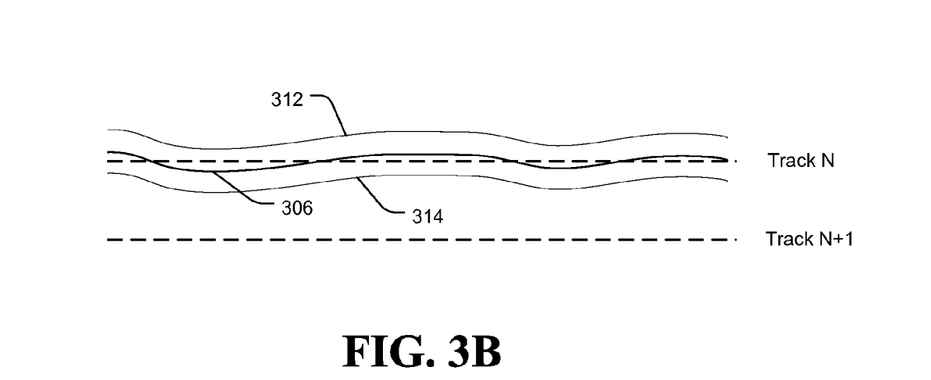

Turning to FIG. 3B, lines 312 and 314 represent write fault threshold (WFT) values on each side of the servo centerline 306. The lines 312, 314 may represent some percentage of acceptable off-track deviation of the position of the write transducer (e.g. head 219 of FIG. 2) during the writing of data to the target track N. This value can vary but may be on the order of about +/−15% of a total track width value. Any suitable values can be used for the WFT values. If the transducer moves outside of the WFT area, a write fault may be declared and the transducer will not write data. It should be noted that FIGS. 3A and 3B illustrate a single-sided squeeze condition between tracks N and N+1. In many cases, there may also be a double-sided squeeze condition including the simultaneous encroachment of tracks N−1 and N+1 on the track N. These embodiments apply equally well to both cases. In some embodiments, such as with shingled magnetic recording (SMR), each track may partially overlap an adjacent track, and data may only be written in a specified direction (e.g. first track N−1, then track N, then track N+1, etc.). An acceptable WFT may vary between conventional recording and SMR. In general, the WFT is the same on both sides of the track but, in some embodiments, such as with SMR, in may be beneficial to make the WFT greater on one side of centerline 306 than on the other side (e.g. the WFT of line 312 may be 10% off of centerline 306, while the WFT of line 314 may be 15 or 20% off of centerline 306).

In order to maximize areal data density on a medium, it may be desirable to determine a minimum track pitch at which a data storage device's recording system can operate within a specified error threshold. This may be referred to as a track pitch value or track pitch capability value.

This may be referred to as a "squeeze-to-dead" or "squeezed-to-death" track pitch, or $P_{S2D}$. The value $P_{S2D}$ may correspond to the minimum spacing between the respective target track N and adjacent "aggressor" track N+1 in the absence of TMR and ignoring secondary RSS effects. That is, assuming that both tracks were written so as to be perfectly circular and aligned along the respective ideal centerlines 302, 304 (see FIG. 3A), the distance $P_{S2D}$ would constitute the minimum track pitch where all of the sectors on track N were fully recoverable. $P_{S2D}$ may depend only on RSS effects and may be independent of servo-mechanical effects. Example methods of calculating $P_{S2D}$ may be seen in co-pending patent application titled "Identifying Track Pitch Capability of a Recording Device," application Ser. No. 14/019,217 (the '217 application) filed on Sep. 5, 2013, which application is incorporated by reference herein for all purposes. Other methods of selecting track pitch may also be used.

The optimal pitch for a track may vary circumferentially along the track, due to irregularities in the servo centerlines 306 and 308 (of FIG. 3A) and other RRO errors. Accordingly, the write fault threshold WFT may be adjusted according to variation in the track pitch value or $P_{S2D}$. This can be applied for both double-sided (DS) and single-sided (SS) squeeze cases. For example, an optimum track pitch to minimize both hard errors and track pitch for double sided squeeze may be expressed in the following equation:

$$TP_{DS}=P_{S2D,DS}+0.5*IWIRRO+WFT$$

where IWIRRO stands for incoherent written in repeatable run out. A method for calculating IWIRRO is discussed in the '217 application. In another example, an optimum track pitch for single-sided squeeze may be expressed in the following equation:

$$TP_{SS}=P_{S2D,SS}+IWIRRO+2*WFT$$

Accordingly, if $P_{S2D}$ varies circumferentially along a track, the WFT can be varied in a complementary way to reduce circumferential variation in hard error rate and minimize TP. The potential ADC (areal density capability) gain may depend on the severity of the storage media's circumferential variation.

Figure 4:
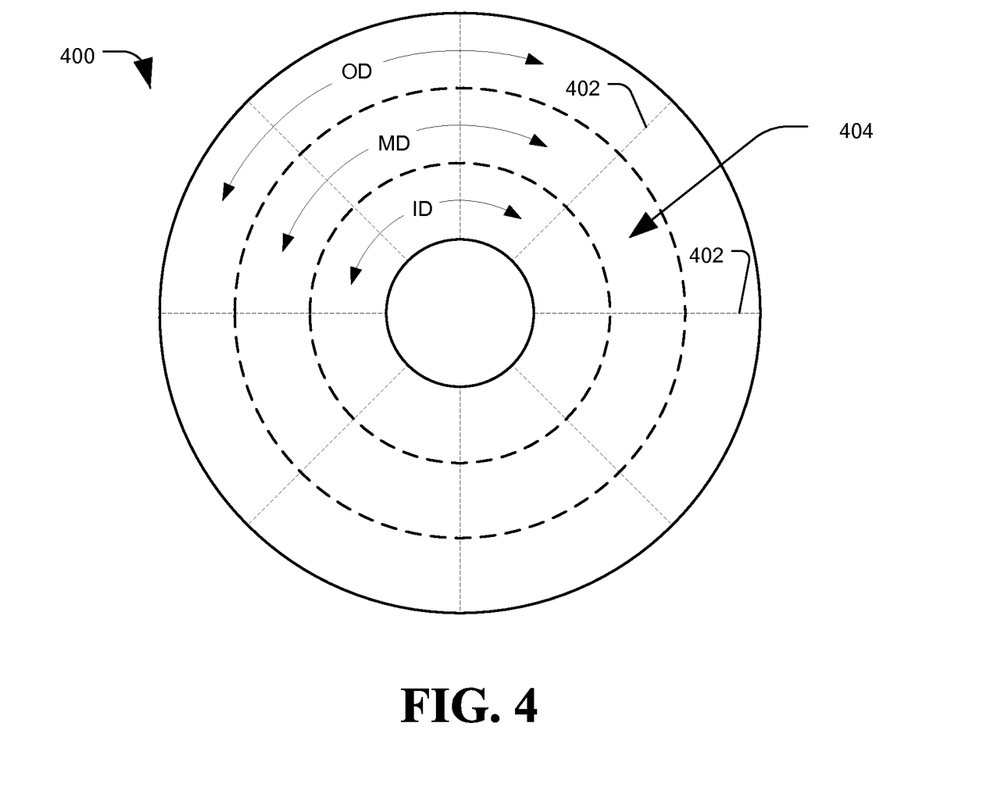
FIG. 4 is a diagram of another illustrative embodiment of a system for write fault modulation.

Turning to FIG. 4, an example embodiment of a system for write fault modulation is shown. Example disc data storage medium 400 may include a plurality of concentric circular tracks for storing data. In other embodiments, one or more spiral tracks may be used instead of individual concentric tracks; however, such configurations may be handled similarly, and for ease of discussion individual tracks shall be used for description herein. Disc medium 400 may be divided into concentric circular zones (e.g. 16 or 32 zones), with each zone including one or more tracks. Disc 400 may also have an outer diameter (OD), a middle diameter (MD), and an inner diameter (ID).

Disc 400 may include servo data 402 recorded radially on the disc and used to define the locations of tracks on the disc. This servo data 402 can be arranged as "spokes" on the disc 400, which can divide the disc into servo wedges 404. In other words, a servo wedge may refer to a circumferential distance around a disc medium bounded by servo data. While 8 servo spokes 402 are depicted for simplicity, discs commonly have many more, such as 300 or more servo wedges. Further, each track may have a number of data blocks or sectors (or in some cases, fractional sectors) between each set of servo spokes 402. Furthermore, it may be possible to achieve nearly continuous servo feedback by embedding servo information within or under the data sectors.

Discs may exhibit more $P_{S2D}$ variation at the OD than at the MD or ID due, for example, to nonuniformity during disk manufacture. Similarly, the ID may exhibit $P_{S2D}$ variation due to effects such as clamping distortion. Commonly, sectors where $P_{S2D}$ is largest (and the probability of encroachment from one track onto another is greatest) will predictably be in the same circumferential area for every track in the same radial area or location, although these variations may become less pronounced or disappear when moving from the OD to the MD, for example. Also, $P_{S2D}$ variation may only vary slowly when moving circumferentially around a disc.

Accordingly, circumferential write fault modulation may be implemented by determining an appropriate write fault threshold at a limited number of locations on a disc. A WFT value determined for a given point on a medium may then be used for an area of the medium including that point. In an embodiment, a write fault threshold could be determined for every servo wedge at the OD, the MD, and the ID of a disc, and these values could be stored to a table. For example with regards to FIG. 4, a different WFT may be calculated for each servo wedge at the OD, the MD, and the ID, for a total of 3 WFT values per servo wedge, 8 WFTs each for the OD, MD, and ID, and 24 total WFT values. In other embodiments, WFT values may be calculated per zone or even per track instead of per OD, MD, and ID. In some embodiments, more $P_{S2D}$ variation may appear in the OD or ID, and a greater number of WFT values may be determined for locations in the OD or ID than in the MD. For example, a WFT value may be determined for every servo wedge of every zone in the OD, but only for every other servo wedge in every three zones in the MD. WFT may also be determined per X servo wedges (e.g. one WFT value per zone per two servo wedges), per Y data sectors, or even per data sector. For example, a WFT may be stored for circumferential points corresponding to a number of servo wedges less than all servo wedges of a data storage medium. In some embodiments, a WFT may be stored for circumferential points corresponding to a number of data sectors less than all data sectors of a data storage medium. For example, in some instances data sectors may be larger than the distance between servo wedges, and storing WFT values per sector may be practicable without excessive overhead. Other criteria may also be used to define the area of a data storage medium to which each WFT applies.

WFT values for each area may be determined and stored, for example in a table stored to a memory of a data storage device (DSD). Those values may be referenced and used directly during data write operations. In some embodiments, a DSD may use interpolation to calculate WFT values for areas between the measured points. Different forms of interpolation may be used; for example, linear interpolation or higher order polynomial interpolation. In an example embodiment, linear variation in the WFT for tracks may be assumed when moving from the OD of servo wedge 7 to the MD of servo wedge 7, or moving between servo wedge 6 of the OD to servo wedge 7 of the OD. In some embodiments, polynomial interpolation may be used to determine a WFT value to use between the measured points, and an array of polynomials could be stored instead of or in addition to independent WFT values. For example, a stored data set of measured values corresponding to individual circumferential points may be used to construct a polynomial representing the WFT around the circumference of a storage medium (e.g. determine WFT at 32 different wedges of the OD, and fit a polynomial of appropriate order). A different polynomial can be fit from other data at different radii and then a second interpolation step can be performed to obtain the correct WFT values at all locations. Other embodiments are also possible.

Figure 5:
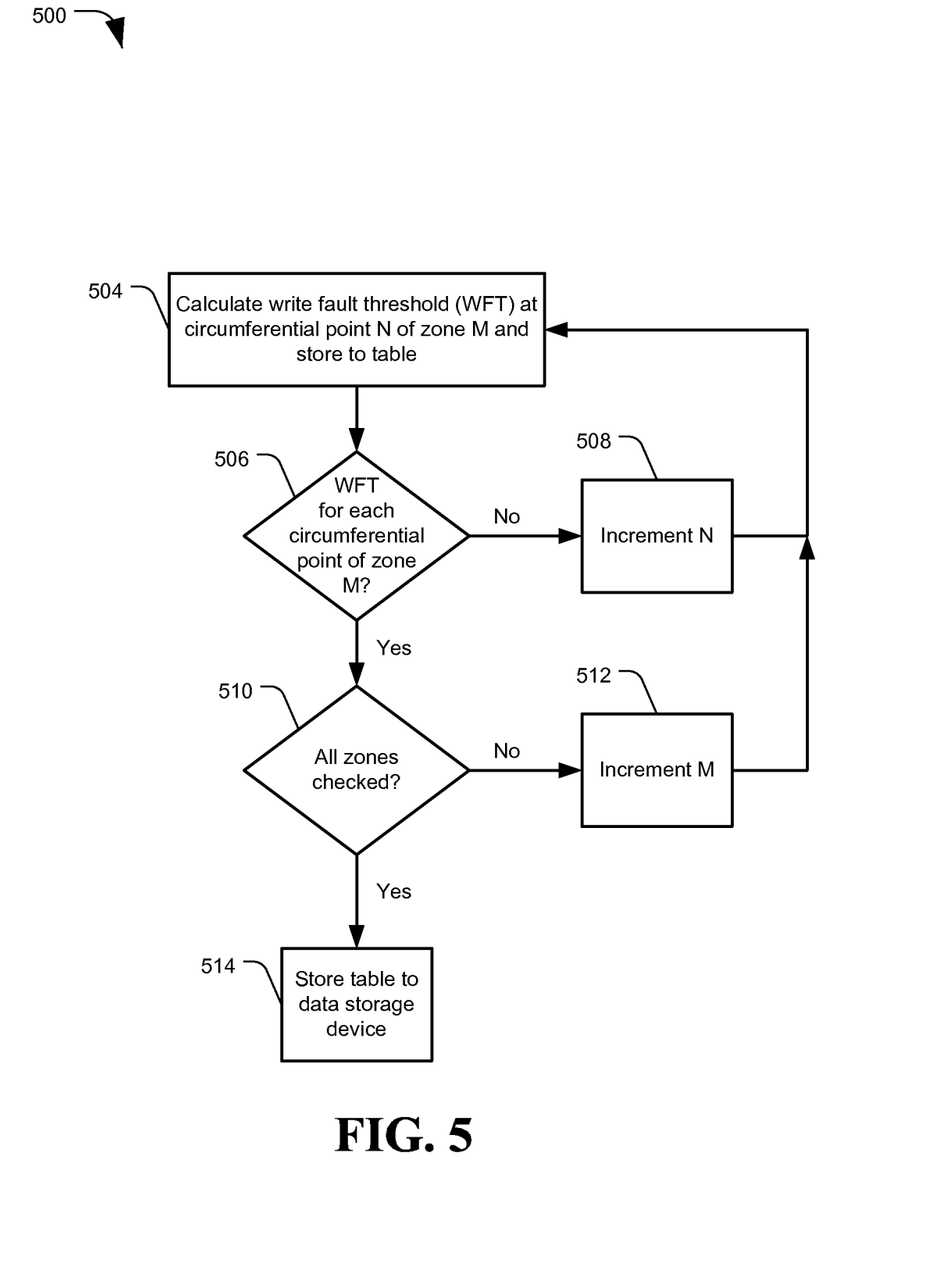
FIG. 5 is a flowchart of an illustrative embodiment of a method for write fault modulation.

Turning to FIG. 5, a method for write fault modulation is shown and generally designated 500. The method may include calculating a write fault threshold (WFT) at a circumferential point N of zone M and storing the value to a table, at 504. This may involve determining a track pitch capability value to achieve a given error rate, such as $P_{S2D}$, and calculating the WFT based on the determined pitch value. This process may be performed during manufacture of a DSD, for example by a manufacturer during a certification process. In some embodiments, the determination of the WFT may be performed by the DSD itself during field operation if circumferential properties vary over time.

The method 500 may involve determining whether a WFT value has been determined for each circumferential point of zone M, at 506. If not, the method 500 may involve incrementing N and moving to the next circumferential point in zone M, at 508. The method may then continue at 504.

If a WFT has been determined for every circumferential point of zone M at 506, the method may involve determining if WFT values have been determined for all zones, at 510. If not, the method may involve incrementing M and moving on to the next zone, at 512. The method may then continue at 504. If WFT values have been determined for all zones, at 510, the method may then include storing the table of WFT values to a memory of the data storage device (e.g. a ROM), at 514. The WFT values may then be used by the DSD during write operations (e.g. by controller 206 or servo control 220 of FIG. 2) to control write faults. In some embodiments, polynomials may be calculated based on the measured WFT values and stored to the DSD instead of or in addition to the table of WFT values itself. Any internally consistent implementation or algorithm, including the method of storing, retrieving, and applying this WFT information, can be used for mapping the WFT values determined at various points on the medium, to the WFT values that are applied during write operations at all points on the medium.

It should be understood that "circumferential points" referenced in method 500 may include individual data sectors, sets of sectors, servo wedges (or verses), sets of servo wedges, or any other metric for circumferentially dividing a storage medium. Similarly, the "zones" referenced in method 500 may be replaced with tracks, sets of tracks, outer, middle, and inner diameters, or any other metric for radially dividing a storage medium.

Figure 6:
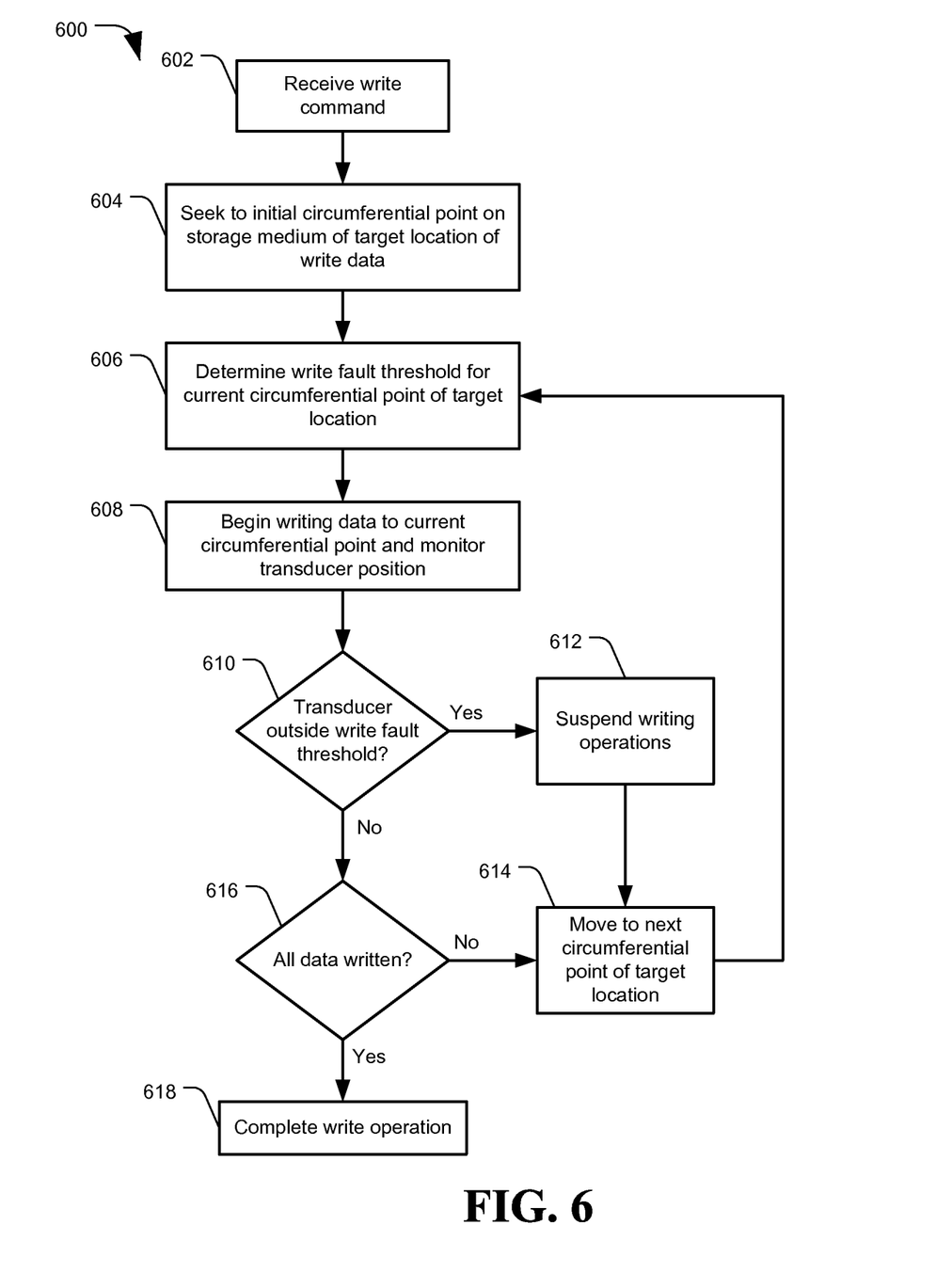
FIG. 6 is a flowchart of another illustrative embodiment of a method for write fault modulation.

FIG. 6 depicts another example method for write fault modulation, generally designated 600. The method may comprise receiving a write command, for example at a data storage device (DSD) from a host, at 602. The method 600 may include seeking to an initial circumferential point on a storage medium of a target location of the data to be written, at 604. For example, a data storage device may need to write the data to a portion of a track including several servo wedges, and may therefore determine where it will begin writing and what circumferential point that corresponds to.

The method 600 may next involve determining a write fault threshold for the current circumferential point of the target location, at 606. For example, the DSD may look up a WFT value in a table corresponding to the current circumferential point and data track. In some embodiments, determining the write fault threshold may include calculating a value for the current point based on a polynomial or WFT values for nearby locations.

The method 600 may include beginning to write data to the current circumferential point of the target location and monitoring a position of a transducer performing the write operation. For example, this may include comparing how far off a track centerline defined by servo data the transducer has become, and comparing this to the write fault threshold determined at 606.

The method 600 may include determining if the transducer has moved outside the write fault threshold, at 610. If so, the method may include suspending writing operations at 612, to prevent data on nearby tracks from being overwritten. The DSD may attempt to write the data again to another location or on a subsequent revolution of the storage medium.

If the transducer does not move beyond the write fault threshold, at 610, the method may involve determining if all data of the write command has been written, at 616. If all data has not been written, the method may involve moving to a next circumferential point of the target location, at 614. This may include waiting for the data storage medium to complete a rotation to attempt writing data again if writing operations were suspended, at 612. The method may then involve determining the appropriate write threshold, at 606. If all data has been written, at 616, the write operation may complete, at 618.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device, such as hardware components storing instructions that when executed cause a processor to perform the methods. Instructions for performing the methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
  a circuit configured to:
    adjust a write fault value for a data storing system based on a circumferential point of a target data storage location,
      the write fault value representing an amount of off-track deviation of a data writing system within which data writing operations are performed;
      the circumferential point corresponds to a number of data sectors less than all data sectors of a data storage medium including the target data storage location; and
    write data based on the write fault value.

2. The apparatus of claim 1 comprising the circuit further configured to:
  adjust the write fault value based on a track pitch capability value of the circumferential point.

3. The apparatus of claim 1 comprising the circuit further configured to:
  adjust the write fault value based on a radial location of the circumferential point.

4. The apparatus of claim 3 further comprising:
  the radial location corresponds to a zone including the target data storage location.

5. The apparatus of claim 3 further comprising:
  the radial location corresponds to one of an inner diameter (ID), middle diameter (MD), and outer diameter (OD) including the target data storage location.

6. The apparatus of claim 1 further comprising:
  the circumferential point corresponds to a number of servo wedges less than all servo wedges of a data storage medium including the target data storage location.

7. The apparatus of claim 1 further comprising:
  a disc data storage medium including the target data storage location; and
  the data writing system including a transducer to perform the data writing operations.

8. The apparatus of claim 1 comprising the circuit further configured to:
  retrieve the write fault value from a table including stored values for a plurality of circumferential points.

9. The apparatus of claim 1 comprising the circuit further configured to:
  calculate the write fault value using interpolation of a stored data set.

10. A memory device storing instructions that, when executed, cause a processor to perform a method including:
  receiving a write command including write data;
  determining a first write fault threshold for a first circumferential point of a target location of the write data;
  determining a second write fault threshold for a second circumferential point of the target location;
  performing, using a transducer, a write operation at the first circumferential point based on the first write fault threshold;
  suspending the write operation when a positional deviation of the transducer exceeds the first write fault threshold;

performing a write operation at the second circumferential point based on the second write fault threshold; and suspending the write operation when the positional deviation of the transducer exceeds the second write fault threshold.

11. The memory device of claim 10, the method further comprising:

calculating write fault thresholds for a plurality of circumferential points of a data storage medium; and storing the write fault thresholds to a table.

12. The memory device of claim 10, the method further comprising:

determining the first write fault value based on a track pitch value of the first circumferential point.

13. The memory device of claim 10, the method further comprising:

determining the first write fault value based on a radial location of the first circumferential point.

14. An apparatus comprising:

a data storage medium including tracks;

a transducer to perform data storage operations; and a processor configured to:

select a write fault threshold based on a circumferential point of a target data storage location, the write fault value representing an amount of off-track deviation of the transducer within which data writing operations are performed;

the circumferential point corresponds to a number of servo wedges less than all servo wedges of a data storage medium including the target data storage location; and control data storage operations to the data storage medium using the transducer based on the selected write fault threshold.

15. The apparatus of claim 14, further comprising:

the data storage medium includes a plurality of zones, zones including at least one track; and the processor is further configured to select the write fault threshold based on a radial location of the data storage medium corresponding to a zone including the target data storage location.

16. The apparatus of claim 14, further comprising:

the processor is further configured to select the write fault threshold based on a radial location of the data storage medium corresponding to one of an inner diameter (ID), middle diameter (MD), and outer diameter (OD) including the target data storage location.

17. The apparatus of claim 14, the processor is further configured to:

calculate the write fault value using interpolation of a stored data set.

18. The apparatus of claim 17, the processor is further configured to:

calculate the write fault value using polynomial interpolation.

* * * * *